(12) United States Patent
Henke

(10) Patent No.: US 9,631,984 B2
(45) Date of Patent: Apr. 25, 2017

(54) METHODS FOR DETERMINING THE ANGLE OF INSERTION OF A CORE TEMPERATURE SENSOR

(75) Inventor: Joern Holger Henke, Rorschacherberg (CH)

(73) Assignee: Cuciniale GmbH, Lindau (DE)

( * ) Notice: Subject to any disclaimer, the term of this patent is extended or adjusted under 35 U.S.C. 154(b) by 714 days.

(21) Appl. No.: 14/115,390

(22) PCT Filed: Apr. 12, 2012

(86) PCT No.: PCT/EP2012/001587
§ 371 (c)(1),
(2), (4) Date: Nov. 27, 2013

(87) PCT Pub. No.: WO2012/149997
PCT Pub. Date: Nov. 8, 2012

(65) Prior Publication Data
US 2014/0086274 A1    Mar. 27, 2014

(30) Foreign Application Priority Data

May 5, 2011 (DE) .................. 10 2011 050 123

(51) Int. Cl.
*G01K 13/02* (2006.01)
*G01K 13/00* (2006.01)
(Continued)

(52) U.S. Cl.
CPC ............. *G01K 13/00* (2013.01); *F24C 7/08* (2013.01); *G01K 1/026* (2013.01); *G01K 1/14* (2013.01); *G01K 2207/06* (2013.01)

(58) Field of Classification Search
CPC combination set(s) only.
See application file for complete search history.

(56) References Cited

U.S. PATENT DOCUMENTS 6,753,027 B1    6/2004  Greiner et al.
7,102,107 B1 *  9/2006  Chapman ............... F24C 7/082
                                                          219/492

(Continued)

FOREIGN PATENT DOCUMENTS

DE        4302190        7/1994
DE     19945021 A1       4/2001
(Continued)

OTHER PUBLICATIONS

International Search Report for PCT/EP2012/001587 dated Sep. 19, 2012.

*Primary Examiner* — Lisa Caputo
*Assistant Examiner* — Nasir U Ahmed
(74) *Attorney, Agent, or Firm* — Marshall, Gerstein & Borun LLP

(57) ABSTRACT

Methods for determining the insertion angle of a core temperature probe having a plurality of temperature measuring points in food to be cooked for controlling a cooking process, in which, starting at a time after insertion of the core temperature probe into the food to be cooked, the insertion angle of the core temperature probe into the food to be cooked is determined based on a measured increase in temperature of at least two temperature measuring points over time. The invention further relates to a control unit for a cooking appliance for carrying out such a method, and to a cooking appliance comprising such a control unit and at least one core temperature probe.

16 Claims, 1 Drawing Sheet

(51) Int. Cl.
*F24C 7/08* (2006.01)
*G01K 1/02* (2006.01)
*G01K 1/14* (2006.01)

(56) References Cited

U.S. PATENT DOCUMENTS

| | | | |
|---|---|---|---|
| 7,566,168 B2 * | 7/2009 | Rund | G01K 3/00 374/102 |
| 2006/0137194 A1 * | 6/2006 | Tyroler | G01C 15/002 33/277 |
| 2006/0185523 A1 | 8/2006 | Wiedemann et al. | |
| 2008/0043809 A1 | 2/2008 | Herbert | |

FOREIGN PATENT DOCUMENTS

| | | |
|---|---|---|
| DE | 20202317 U1 | 5/2002 |
| DE | 102007057107 | 6/2006 |
| DE | 102005057884 A1 | 6/2007 |
| EP | 1688721 A1 | 8/2006 |
| EP | 1757862 A2 | 2/2007 |
| EP | 1793173 B1 | 10/2008 |
| EP | 2063183 B1 | 6/2013 |
| WO | WO-03069232 A1 | 8/2003 |

* cited by examiner

METHODS FOR DETERMINING THE ANGLE OF INSERTION OF A CORE TEMPERATURE SENSOR

BACKGROUND OF THE INVENTION

Field of the Invention

The invention relates to a method for determining the insertion angle of a core temperature probe having a plurality of temperature measuring points in a food to be cooked for controlling a cooking process.

The invention further relates to a control unit for a cooking appliance for carrying out such a method and to a cooking appliance comprising such a control unit.

Related Technology

Automatic cooking processes are used primarily in professional cooking appliances, but increasingly also in household appliances.

For this purpose, essentially a so-called core temperature probe, which measures the temperature in the interior of a food to be cooked using at least one measuring site, and a control electronics unit are used. Such an assembly is described in WO 93/16333 A1, for example. Here, a lance-type tubular part comprising at least three thermistors is described, which is connected to a control electronics unit. This invention is characterized in that the thermistors are connected to each other at a distance of 1 cm to 3 cm either in a star or triangular shape.

A plurality of control methods for controlling cooking appliances have been previously proposed, which are based on the evaluation of temperature measurements taking place by way of a core temperature probe in a food to be cooked. A core temperature probe generally comprises several thermocouples, which are arranged in a thin lance that is inserted into the food to be cooked so as to monitor the state of the food to be cooked during a cooking process and thus control the cooking process. Such cooking methods are disclosed in EP 2 178 341 A2 as well as EP 1 021 979 A1, for example Because the temperature measuring points provided for in the lance do not always end up at the coldest point in the food to be cooked and are thus not always able to directly determine the core temperature of the food to be cooked, it takes some effort to calculate or estimate the actual core temperature based on the available measuring data. According to the related state of the art, this is only done when the measuring points are located far away from the actual core of the food to be cooked.

A description of a linear arrangement of temperature measuring points and of a method for considering the thermokinematics of the temperature values is known from DE 199 45 021 A1, for example. The temporal progression, the temperature difference between the measuring sites located in the food to be cooked, and the temperature measured outside the food to be cooked are used for controlling the process. Without providing a more detailed description, it is proposed to determine the core temperature of the food to be cooked by extrapolation or iteration. The drawback here is that, at present, no ideas exist as to how such a method could be implemented in concrete terms, in particular if no exact positioning of the core temperature probe has taken place. So as to prevent unfavorable placement of the core temperature probe, positioning aids are frequently employed in practice, which move the core temperature probe to a predefined position so as to reduce position errors of up to 1.5 cm both inside and outside the food to be cooked. However, this works only conditionally because the expansion of the foods to be cooked differs greatly and may change significantly, for example in the case of baked goods during baking. Because the determination of the core point and edges of the food to be cooked is imprecise, the cooking result from automatic cooking processes is often not good.

To prevent this, it is proposed in DE 103 32 021 B3 to enter the thickness of the food product. The drawback here is that this is inconvenient and cumbersome for the user. A technical solution for automatically measuring the thickness can be found in DE 43 02 190 A1. However, neither of the disclosures describes an option for a way to determine the core temperature of the food to be cooked.

GENERAL DESCRIPTION OF THE INVENTION

Thus, it is the object of the invention to overcome the drawbacks of the prior art. In particular the center of the food to be cooked and the thickness of the food to be cooked are to be able to be determined relatively precisely, and an optimal cooking result is to be attained based on measurements using automatic cooking processes. A method is to be provided for this purpose, which is used to determine a suitable parameter therefor.

The object of the invention is achieved by a method for determining the insertion angle of a core temperature probe having a plurality of temperature measuring points into food to be cooked for controlling a cooking process, wherein the insertion angle refers to the angle between the surface of the food to be cooked in which a lance of the core temperature probe is located and this very lancet, wherein, starting at a time t2 after insertion of the core temperature probe into the food to be cooked, the insertion angle of the core temperature probe into the food to be cooked is determined based on a measured increase in temperature of at least two temperature measuring points over time.

The insertion angle can be determined in any arbitrary form. All conceivable units of measurement for the insertion angle may be used for evaluations for the present invention, in particular the conventional units of measurements that are degrees, angular minutes, angular seconds, round angle and radian. According to the invention, the insertion angle of a core temperature probe into food to be cooked refers to the angle between the surface of the food to be cooked in which a lance of the core temperature probe is located and this very lancet of the core temperature probe. The term lance denotes the region of the core temperature probe that is intended for introduction into the food to be cooked and that includes the temperature measuring points for determining the temperatures in the interior of the food to be cooked. The lance is preferably designed to be straight.

Within the meaning of the present invention, the determination of the insertion angle of the core temperature probe is deemed to be equal to the determination of other variables from which the insertion angle can be directly derived and which are used to control a cooking process. For example, the insertion angle can be calculated from the different distances of the temperature measuring points to the surface of the food to be cooked when the distances of the temperature measuring points from each other are known. The insertion angle can be determined from these distances using a simple trigonometric calculation. The distances of the temperature measuring points from the surface of the food to be cooked thus represent a variable that is equivalent to the insertion angle of the core temperature probe, which hereby are expressly covered by the term 'insertion angle of the core temperature probe' within the meaning of the present invention.

According to the present invention, a controllable cooking process shall be understood to mean an at least partially automated program that controls at least the heat input into a food to be cooked and thereby contributes to a predetermined target result. The heat input may take place by way of heating elements, a stovetop, an induction coil or a microwave source, for example.

The invention also proposes that the insertion angle is the angle between a straight lance of the core temperature probe and the surface of the food to be cooked at the insertion point with an angle greater than 0° and up to 90°.

According to the invention, a value can be determined by way of alphanumeric calculation. The calculations may be carried out by a microprocessor of a control unit controlling the cooking appliance. To this end, preferably the temperature of a stovetop, the temperature of a cooking chamber, the temperature of a cooking medium, in particular water or oil, the fan speed of a convection oven, the moisture in a cooking chamber and/or another variable that influences the cooking process of food to be cooked are determined.

According to the invention, it may be provided that at least a time derivative of the temperature at a temperature measuring point is calculated by forming a quotient from the temperature difference of a temperature measuring point at two times, or the temperature difference between two temperatures that are averaged over time and the time difference between the two times or the average time difference between the two times.

It may also be provided that the at least one averaged time derivative of the temperature at a temperature measuring point is measured by averaging several time derivatives of the temperature at a temperature measuring point.

According to the invention, it may be provided particularly preferably that at least one variable is associated with certain temperature differences between two temperature measuring points, time derivatives of the temperature difference between two temperature measuring points, time derivatives of the temperature at a temperature measuring point, averaged time derivatives of the temperature at a temperature measuring point and/or the insertion angle, the variable being considered in controlling the cooking process, wherein the relationship with the at least one variable and the effect that the application of the at least one variable has on the cooking process are calculated and/or empirically determined beforehand.

Such variables can be applied to the cooking process, for example, by being used in the calculation of the heating energy that is introduced into a cooking chamber, the power of an induction and/or microwave generator, the power of a stovetop, the rotational speed of a fan wheel to generate convection air, the power of a steam generator and/or the gas supply of a gas burner for heating the food to be cooked, and therefore have an effect on the cooking process. In short, the variables can be used to influence the controlled variables that are employed to control the cooking process.

According to the invention, it may be provided still more particularly preferably that a correction contribution is determined, preferably calculated, from temperature differences between two temperature measuring points, time derivatives of the temperature difference between two temperature measuring points, time derivatives of the temperature at a temperature measuring point, averaged time derivatives of the temperature at a temperature measuring point and/or the insertion angle of the core temperature probe, this correction contribution being subtracted from the lowest and/or second-lowest measured temperature of the temperature measuring points in the food to be cooked so as to calculate the current core temperature and/or the core temperature to be expected at a later point in time.

This results in particularly suitable methods for obtaining as much information as possible from the measured data for controlling the cooking process. The cooking process that is controlled based on this information can result in particularly good cooking results when the data, which may also have been gained empirically by way of experiments, is appropriately applied, so that the cooked food meets the desires of the user particularly well.

The invention also proposes that it is determined, at a first time $t_1$ after insertion of the core temperature probe into the food to be cooked, based on the temperatures of the temperature measuring points which of the temperature measuring points are located within the food to be cooked and/or outside the food to be cooked and that, starting at the second time $t_2$, which is temporally after the first time $t_1$, the insertion angle of the core temperature probe into the food to be cooked is determined based on the increase in temperature of at least two temperature measuring points that were determined as being located within and/or not outside the food to be cooked.

For this purpose, it may be provided that a temperature measuring point is defined as being located outside the food to be cooked if this point exceeds a threshold temperature at the time $t_1$, preferably a threshold temperature that is in the range of an ambient temperature, and/or a temperature measuring point is defined as being located within the food to be cooked if this point, together with a further temperature measuring point, has a temperature below the ambient temperature or below a temperature that is 0.1° C. to 10° C. above the ambient temperature, preferably 1° C. to 5° C. above the ambient temperature.

Because of such an early definition, the method may be carried out promptly and particularly reliably, without the risk of the value of the insertion angle having to be corrected later because the determination of the insertion angle was carried out based on unsuitable temperature measuring points. The ambient temperature may be measured using a temperature sensor in the handle of the core temperature probe.

In general, this definition according to the invention is carried out as a function of the cooking process and/or of the food to be cooked when it is being determined whether a measuring point is located outside the food to be cooked. It makes a difference, for example for the ambient temperature, whether fish is being poached or pan-fried, or whether food to be baked has a doughy or solid consistency. Such information can be read from user input on the cooking appliance or from other measurements of the cooking appliance. With the aid of this information, it is then possible to define suitable criteria, which determine whether a temperature measuring point is located within or outside the food to be cooked.

Methods according to the invention can also be characterized in that a correction factor is determined from the insertion angle, a determination of the core temperature of the food to be cooked is made in which the correction factor is multiplied with a correction contribution, and the correction contribution multiplied with the correction factor is subtracted from the lowest measured and/or second lowest measured temperature, and the core temperature thus determined is used to control the cooking process.

The use of such a correction factor makes it possible to employ arithmetic operations, so that conventional data processing systems and computers can be easily employed at any time for controlling the method. When the lowest and the second-lowest temperatures of the temperature measuring points located within the food to be cooked are used simultaneously, an average value can be obtained from the two calculated core temperatures, which brings about an additional improvement in the determination of the core temperature. For such averaging, both the lowest and the second-lowest measured temperatures then taken into consideration.

To this end, it may be provided that the correction factor increases the closer the insertion angle is to 90°, and preferably the sine of the insertion angle of the core temperature probe is used as the correction factor.

These ways to form concrete definitions have been found to be particularly suitable for carrying out methods according to the invention.

It may also be provided that the correction contribution is dependent on the spatial distance of the two temperature measuring points having the lowest temperature, the temperature difference between at least two temperature measuring points, in particular the temperature difference between the two temperature measuring points having the lowest temperature, and/or on the change of the temperature of at least one temperature measuring point over time, and preferably of at least two temperature measuring points.

These dependencies of the correction contribution can be implemented particularly easily in conventional data processing systems. The method can thus be implemented particularly easily in an existing cooking appliance control unit.

It may further be provided that the insertion angle is used, and preferably is taken into consideration computationally, in a determination of the core temperature of the food to be cooked, in a determination of a cooking end time of the cooking process and/or in a control of the energy input into the food to be cooked for controlling the cooking process after the time t2.

Instead of calculating the core temperature and terminating the cooking process after a specified core temperature has been reached, or terminating the cooking process after a specified core temperature has been maintained over a certain period of time, it is also possible to partially or entirely dispense with the determination of the core temperature for determining the cooking end time. According to the invention, the cooking process is terminated for this purpose when, depending on the insertion angle, a particular time has lapsed. The duration of this time may depend on the cooking appliance, different parameters of the food to be cooked, such as the size, pretreatment and properties, and/or on the insertion angle. As an alternative or better additionally, it is also possible to carry out the energy input into the food to be cooked by increasing the power of the heating elements, microwave generator, stovetops, steam generator or the like as a function of such parameters.

The cooking process may also be controlled not by calculating a corrected core temperature and using the same for controlling the cooking process, but by calculating a correction factor from the insertion angle and the temperature or temperatures measured in the food to be cooked, this factor being added to the cooking end time so as to extend the cooking process and thereby obtain the desired cooking result. In principle and strictly speaking, this is nothing other than a correction of the core temperature and use of the corrected core temperature. The same applies to the change of the energy input into the food to be cooked by adapting the power of heating elements, such as the stovetop or the heat exchanger of a gas heater of an oven. Such solutions are thus in fact equivalent to the use of a corrected core temperature for controlling a cooking process because here the values (insertion angle and temperatures measured in the food to be cooked, and perhaps also the development of the measured temperatures over time in the food to be cooked) are used to compensate for an error in the measurement of the core temperature, and thus achieve an improvement in the control of the cooking process.

According to the invention, it is particularly preferred if it is provided that the insertion angle for controlling the cooking process is determined under the assumption that the food to be cooked has a homogeneous temperature at the beginning of the cooking process, the heat is uniformly introduced into the food to be cooked from all sides, and the food to be cooked has the shape of a cylinder.

These assumptions are particularly suited for cooking appliances comprising cooking chambers, such as ovens, combi steamers and the like, so that such a method is particularly suited for controlling such cooking appliances.

Alternatively, according to the invention it may be provided that the insertion angle for controlling the cooking process is calculated under the assumption that the food to be cooked has an elevated temperature in the region of an upper side of the food to be cooked at the beginning of the cooking process, the heat is introduced into the food to be cooked from a underside of the food to be cooked, and the food to be cooked has the shape of a flat cylinder.

Such a method is suited for controlling a cooking process on a stovetop and is particularly suited for this purpose, because such control is presently still substantially unknown, but offers enormous potential.

It may be provided that the insertion angle for controlling the cooking process is calculated under the assumption that a temperature measuring point is located at the tip of the core temperature probe and the same is located on the underside of the food to be cooked.

For this purpose, the user of such a cooking appliance requires instructions for placing the core temperature probe. The user is thus instructed to always introduce the core temperature probe into the food to be cooked in such a way that it penetrates the food to be cooked radially at the thickest point down to the bottom of the pan or pot. The instructions can be provided by way of a display unit of the cooking appliance, for example. This added effort may be justified because of the greater reliability in the calculation of the insertion angle.

Another particularly advantageous method according to the invention is characterized in that the distance of at least one temperature measuring point from the surface of the food to be cooked and/or the thickness of the food to be cooked are determined from the insertion angle, and this is used, or these are used, to control the cooking process.

Especially the thickness of the food to be cooked is an excellently suited parameter for controlling cooking processes because the cooking time to be expected can be calculated or determined therefrom particularly well.

It may also be provided that a temperature profile in the food to be cooked and/or the temporal progression of the temperature profile in the food to be cooked are determined from the insertion angle and the temporal progression of the temperature of the temperature measuring points.

Temperature profiles thus determined include a greater number of calculated points than only the existing measured temperature measuring points. The core temperature can be ascertained particularly well from continuous curves, which can be represented in particular as mathematical functions, for example as fit functions, and the future temporal progression of the curves can also be estimated particularly well. In addition, a fit allows particularly exact values for certain points of the curves to be achieved due to the large number of measured values that are considered, such as the minimum of the curve that indicates the core temperature of the food to be cooked.

According to a further embodiment of the invention, it may be provided that the temporal progression of the temperature profile and/or the temporal and/or local progressions of the core temperature in the food to be cooked for the future are determined from the insertion angle and the temporal progressions of the temperatures of the temperature measuring points, in particular from the temperature profile in the food to be cooked and/or the temporal progression of the temperature profile in the food to be cooked, wherein the forecast temporal progression of the temperature profile and/or the forecast temporal and/or local progression of the core temperature in the food to be cooked is used to control the cooking process.

This offers additional options for controlling the cooking process that is taking place with particular precision.

The object of the invention is also achieved by a control unit for a cooking appliance for carrying out a method according to the invention, wherein the control unit comprises a microprocessor and a memory for calculating the insertion angle, for carrying out a cooking process, and for controlling a cooking appliance.

Finally, the object of the invention is achieved by a cooking appliance comprising such a control unit and at least one core temperature probe having a plurality of temperature measuring points, wherein the cooking appliance preferably comprises at least one stovetop, an induction cooktop, an oven, a combi steamer, a steamer or a microwave oven.

The invention is based on the surprising findings that it is possible to control the cooking process more precisely, and thus achieve an improvement in the cooking result, by determining the insertion angle into the food to be cooked. The insertion angle may be used to achieve an improvement in the determination of the core temperature and/or to determine the thickness of the food to be cooked.

In particular in the case of quickly pan-fried foods, such as fish, steaks or chicken breast, one can assume that the food to be cooked will have a flat shape in a sufficiently approximate manner. The food to be cooked as such is assumed to be homogeneous food to be cooked in terms of heat conduction. In an oven, the heat penetrates into the planar food to be cooked from the two flat parallel sides, while in the case of a pan the temperature penetrates into the food to be cooked only from one side. Over time, a temperature profile that is dependent on the thickness of the food to be cooked will develop in the food to be cooked. Other parameters, such as the cooking chamber temperature, for example, the temperature of the pan, or the extent of the air circulation in the cooking chamber, are known. In the case of flat food to be cooked, or also in the case of food to be cooked having a somewhat even surface through which the heat penetrates, one may initially assume that the temperature T is a function of the distance x from the surface through which the heat penetrates into the food to be cooked and from the time t.

The temperature measuring points on a lance are defined, which is to say they have defined, and consequently known, distances from each other. The distances $x_i$ of the temperature measuring points i from the surface of the food to be cooked through which the heat is introduced depend on the insertion angle of a core temperature probe equipped with a straight lance into the food to be cooked relative to this surface. Put simply, the temperature difference between two temperature measuring points on the lance decreases as the angle between the surface of the food to be cooked through which the heat penetrates into the food to be cooked and the core temperature probe, or the lance of the core temperature probe, decreases, because the difference between the distances $x_i-x_i+1$ of the temperature measuring points i and i+1 and the surface of the food to be cooked assumed to be even then likewise becomes smaller.

Also the speed of the temperature change dT/dt, which is to say the first derivative of the temperature with respect to time, of each point in the food to be cooked during heating of the food to be cooked also depends on the distance x from the surface of the food to be cooked through which the heat penetrates into the food to be cooked.

Thus, conversely the insertion angle of the core temperature probe into the food to be cooked, or the angle of the core temperature probe relative to the surface of the food to be cooked through which the heat penetrates into the food to be cooked (in the present example according to the invention likewise referred to as the insertion angle), can be determined from both pieces of information. The temperature differences between the temperature measuring points, the temperature change of the temperature measuring points over the time, and the differences between the temperature changes of the temperature measuring points over the time may also be used to determine the insertion angle of the core temperature probe into the food to be cooked.

This information, in turn, may be used to control the cooking process. The thickness of the food to be cooked can be determined from the distances xi of the temperature measuring points i from both surfaces and the insertion angle.

In addition, the core temperature can be determined with greater precision. When measuring the core temperature, it is to be assumed, in the case of flat food to be cooked, that a temperature measuring point of the core temperature probe will not end up exactly in the core temperature plane, which is to say the plane having the lowest temperature in the food to be cooked, but instead this plane will be located somewhere between the two temperature measuring points having the lowest temperatures. The greater the temperature difference between these two temperature measuring points is, the closer is the core temperature to the temperature measuring point having the lower temperature, both locally and in absolute terms. However, added to this is a contribution that depends on the insertion angle at which the core temperature probe, or the lance of the core temperature probe, is placed into the flat food to be cooked. The smaller the insertion angle, the closer are also the two temperature measuring points having the lowest temperatures to the core temperature plane. Thus, the smaller the insertion angle, the smaller is the difference between the temperature of the coldest temperature measuring point and the core temperature. The contribution that can be calculated from the temperature difference between the two coldest temperature measuring points can thus also be weighted with the insertion angle so as to allow as exact a determination as possible of the actual core temperature.

According to the invention, further correction factors may also be considered in the determination of the core temperature, which depend on the design and the influence of the core temperature probe itself and can be determined empirically.

For example, according to the invention the following method steps can be carried out:

1. Determining the temperatures $T_i$ at several temperature measuring points in a food to be cooked at a time $t_0$ using a temperature probe having several discrete temperature measuring points with a defined distance $y_i$ from each other on the lance of the core temperature probe.

2. After energy has been applied to the food to be cooked/food product, preferably after allowing a settling time to pass, measuring the temperatures $T_i$ at several times to at the individual temperature sensors $T_{i,n}$ and calculating the increase in the temperature progressions.

3. For determining the center of the food to be cooked, the insertion angle and the temperature measuring points are determined, which are located within the food to be cooked. This is done, for example, by:

1) monitoring the increase in temperature over a certain period of time. If the increase is less than a defined increase, the temperature measuring points in question are located within the food to be cooked.

2) determining the rate of the increase in temperature in at least two different temperature measuring points, wherein the insertion angle is determined from the rate of the increase in temperature. This can be established, for example, as follows:

a) The energy taken up by the food to be cooked/food product down to a depth in the food to be cooked, which is defined by the measuring point i, in an arbitrary region, the width of which perpendicularly to the depth in the food to be cooked is selected so that the food to be cooked, in a good approximation, has a flat surface through which the heat enters, and the influences from heat convection into the food to be cooked having a contribution that deviates from the perpendicular to the surface can be neglected, can be calculated as follows:

$$\Delta Q_i = m^* cW^* \Delta T_i$$

where m is the mass of this region, and cW is the specific heat of the food to be cooked.

The mass m can be determined from the density ρ as a function of the distance from the edge of the food to be cooked using the following formula:

$$m = \rho^* A^* x_i,$$

where ρ denotes the density, A denotes the surface defined by the width, and xi denotes the rectangular distance from the edge of the food to be cooked, which is to say a surface through which heat is supplied to the food to be cooked. This results in:

$$\Delta Q_i = \rho^* cW^* A^* x_i^* \Delta T_i$$

The insertion angle α is calculated from: $\sin(\alpha) = xi/yi$, where xi is the distance from the detected edge.

Thus $\Delta Q_i = \rho^* cW^* A^* \sin(\alpha)^* x_i^* \Delta T_i$ b) Because ρ and cW are known for the respective foods to be cooked, and the surface A can be considered to be constant, the following proportionality follows for a time period relatively close to the start of the supply of energy:

α is proportional to $\arcsin(\Delta T_i + 1/\Delta T_i)$ c) Having knowledge of the insertion angle α allows the center of the food to be cooked exactly between the two measuring points having the lowest increase in temperature to be determined.

According to the invention, the insertion angle can thus be determined on both sides.

The evaluation of the insertion angle and the temperature behavior can also be used according to the invention to detect faulty insertion of the core temperature probe.

The present invention can be used in cooking appliances having closed cooking chambers, such as baking ovens, deep fryers or combi steamers, where the energy acts on the food to be cooked from all sides. However, the invention can also be employed with cooktops, where the energy acts on the food to be cooked practically only from beneath. This application is in fact particularly advantageous because the core temperature probe does not need to be inserted until the food to be cooked has been turned over.

The core temperature probe is connected to a control electronics unit, which supplies energy in keeping with the progress of the cooking process until the desired end core temperature has been reached.

BRIEF DESCRIPTION OF THE DRAWINGS

In addition to the previously described exemplary embodiments, some of which have general validity, but none of which are limiting, exemplary embodiments of the invention will be described hereafter based on two schematically illustrated figures, however without thereby limiting the invention. In the drawings.

DETAILED DESCRIPTION

Figure 1:
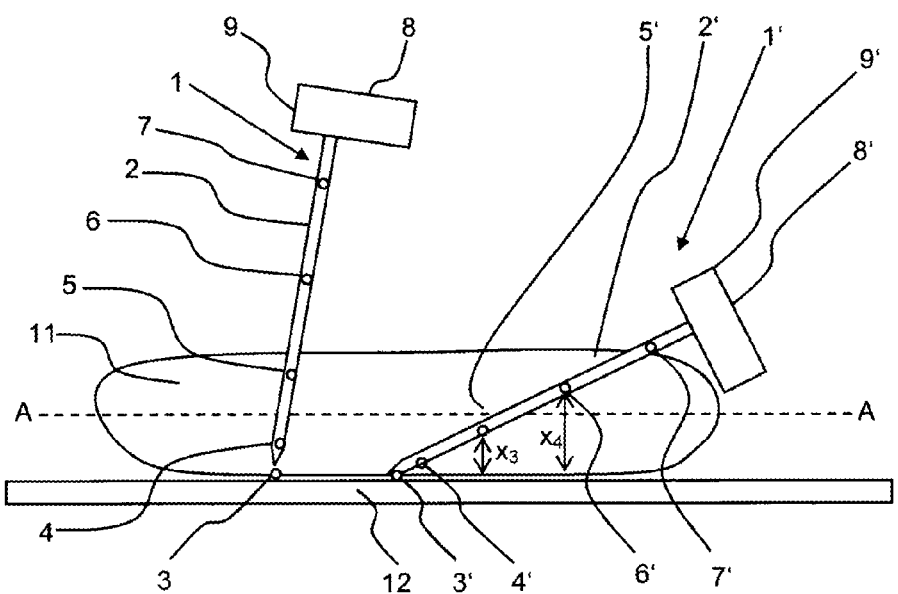
FIG. 1: shows a schematic cross-sectional view of food to be cooked having two core temperature probes positioned at different insertion angles on a heatable panel.

FIG. 1 shows a schematic cross-sectional view of a core temperature probe 1 for a method according to the invention. The core temperature probe 1 comprises a lance 2 in the form of a straight hollow tube having a closed tip. Several thermocouples 3, 4, 5, 6, 7 serving as temperature measuring points are arranged in the lance 2. The core temperature probe 1 further comprises a handle 8 for handling the core temperature probe 1. An additional thermocouple 9 is arranged in the handle 8 and can be used to determine the ambient temperature. A transmitter (not shown) is arranged in the handle 8 of the core temperature probe 1, the transmitter being used to transmit the thermoelectric voltages of the thermocouples 3, 4, 5, 6, 7, 9 to a control unit (not shown).

The lance 2 of the core temperature probe 1 has been placed in food 11 to be cooked, which is located on the hot bottom 12 of a pan or a pot. Heat is transmitted from the pan bottom 12 or pot bottom 12 to the food 11 to be cooked, whereby the food 11 to be cooked is heated from the direction of the underside of the food 11 to be cooked.

The control unit is designed to carry out a method according to the invention and for this purpose instructs the user by way of a display unit (not shown). FIG. 1 shows a situation in which, according to the invention, the food 11 to be cooked has already been seared on the top side over a fixed period of time. After this fixed period of time has lapsed (for example after three minutes), the control unit prompts the user on the display unit and/or by way of an audio warning that the food 11 to be cooked should be turned over and then the core temperature probe 1 and/or a second core temperature probe 1' should be inserted into the food 11 to be cooked. FIG. 1 now shows the situation after insertion.

FIG. 1 additionally shows a further core temperature probe 1', which has been inserted into the food 11 to be cooked at a different insertion angle. A single core temperature probe suffices for the method according to the invention, so that it is not necessary to have both core temperature probes 1, 1'. However, the method can also be easily carried out with more than one core temperature probe 1, 1'. In the present example, the different positions and insertion angles of the core temperature probes 1, 1' are only intended to explain the method according to the invention in two different situations. The tips of the lances 2, 2' are inserted in both cases through the food 11 to be cooked down to the bottom 12 of the pan.

As with the first core temperature probe 1, the second core temperature probe 1' includes a lance 2', five thermocouples 3', 4', 5', 6', 7' in the lance 2', a handle 8', a thermocouple 9' in the handle 8', and a transmitter (not shown) for transmitting data from the core temperature probe 1' to the control unit.

The food 11 to be cooked is heated from beneath by the hot panel 12. This causes the temperature in the food 11 to be cooked to rise. Over time, the temperature continues to penetrate further through the food 11 to be cooked. The following applies to the center portion of the food 11 to be cooked: at a particular time t, the temperature level in the interior of the food 11 to be cooked depends on the distance x of the point in the food to be cooked 11 from the surface of the food 11 to be cooked located on the hot panel 12.

The temperature progression in the food 11 to be cooked can be described in a good approximation mathematically by e-functions as a function of the distance x. Measuring begins 20 to 60 seconds, and preferably 30 to 50 seconds, after insertion of the core temperature probe 1, 1'. These settling times have been found to be particularly advantageous because by then the settling processes and initial inaccuracies due to heat flows in the core temperature probe 1, 1' and the surroundings thereof have been cleared. The first measurement is still more particularly preferably started after 40 seconds. These settling times are also particularly advantageous for a cooking process in a cooking chamber, such as an oven, so as to allow settling processes to pass and thereby obtain a reliable first measurement.

For the first core temperature probe 1 it applies that the temperature measuring points 3 and 4 in the interior of the food 11 to be cooked face the underside of the food 11 to be cooked, while the measuring point 5 in the interior of the food 11 to be cooked faces the top side of the food 11 to be cooked. The temperature measuring points 6 and 7 are located outside the food 11 to be cooked. The thermocouple 9, 9' in the handle 8, 8' of the core temperature probe 1, 1' is always located outside the food 11 to be cooked and may thus be used to determine the ambient temperature. After the settling time, it is measured in the first measurement that the temperatures of the temperature measuring points 6 and 7 have the ambient temperature and should not be located in the food 11 to be cooked for this reason. To assure this, the temporal progression of the temperatures of these measuring points 6, 7 may be tracked further. If no change is recorded, it can be assumed that these are in fact not located in the food 11 to be cooked.

It can also be assumed that the thermocouple 3, 3' in the tip of the lance 2, 2' is positioned in the region of the surface of the food 11 to be cooked, which is being heated by the panel 12. This can be verified by the speed of the increase in the temperature of the temperature measuring point 3, 3' during the cooking process. In any case, the temperature measuring point 4, 4' should be located further from the surface of the food 11 to be cooked than the temperature measuring point 3, 3'. For this reason, the temperature will be higher at the temperature measuring point 3, 3' after the settling time than at the temperature measuring point 4, 4'. The temperature difference between the two measuring points 3, 3', 4, 4' can be used to determine the insertion angle of the core temperature probe 1, 1'. The closer the second temperature measuring point 4, 4' is located to the surface of the food 11 to be cooked, the higher is the temperature thereof and the smaller is the temperature difference thereof from the temperature measuring point 3, 3' in the tip of the lance 2, 2'

With a suitable geometry, however, the insertion angle of the core temperature probe 1, 1' may also be determined based on the temperature differences between any arbitrary other temperature measuring points 3, 3', 4, 4', 5, 5', 6, 6', 7, 7', as will be described hereafter based on the core temperature probe 1' that is inserted flat (at a small insertion angle).

The distance $x_3$ of the third temperature measuring point 5' from the surface of the food 11 to be cooked is larger than the distance $x_4$ of the fourth temperature measuring point 6' from this surface. At a time at which the thermal energy has already deeply penetrated into the food 11 to be cooked, which is to say beyond than the center plane of the food 11 to be cooked, which in FIG. 1 is indicated by the dotted line A-A, this causes the temperature at the temperature measuring point 5' to rise more quickly and to be higher than at the temperature measuring point 6'. This will be the case not until at a later time than the first measuring time, which is to say after the settling time. If the upper side of the food 11 to be cooked has already taken up a large amount of heat, this may result in a smaller deviation from the ideal decay function for the temperature progression in the food 11 to be cooked.

The distances $x_3$, $x_4$ of the measuring points 5', 6' from the surface can be calculated from the known temperature distribution, which in a decay e-function follows in the direction of the interior of the food 11 to be cooked and the known progression of the increase in temperature over the time at different distances xi from the underside of the food 11 to be cooked. Using simple trigonometric formulas, the angle of the lance 2' relative to the surface of the food 11 to be cooked, and thus the insertion angle of the core temperature probe 1', can be determined from the distances $x_3$, $x_4$ and the known distance y of the two measuring points 5', 6' on the lance 2'. The insertion angle is the arc sine of the relationship between the distance difference $x_3-x_4$ and the surface of the food 11 to be cooked and the distances of the measuring points 5', 6' on the lance 2'.

This consideration also applies to any arbitrary other pairs of temperature measuring points 3, 3', 4, 4', 5, 5', 6, 6', 7, 7'. Different insertion angles may result from the different calculations, which may be averaged on a weighted basis over the course of the method so as to obtain a particularly precise value for the insertion angle.

It is then also possible to estimate the thickness of the food 11 to be cooked from the insertion angle and the temporal progression of the temperature of a temperature measuring point 5, 6' in the vicinity of the upper surface of the food 11 to be cooked. The closer a temperature measuring point is located to the upper surface of the food 11 to be cooked, the earlier and more strongly the temperature will decrease again at this point, because the food 11 to be cooked, which has already been seared from this side, cools from above and the heat diffuses into the interior of the food 11 to be cooked. The thickness of the food 11 to be cooked thus determined may be used to control the intensity with which the pan 12 is heated and to abort the cooking process at a suitable time, so that, after the cooking process and an anticipated temperature equalization in the food 11 to be cooked after the cooking process, the food 11 to be cooked has the desired doneness or the desired cooking state.

The insertion angle may also be beneficially incorporated in the determination of the current core temperature. At the end of the cooking process, the core temperature to be achieved should be attained in the center plane A of the food 11 to be cooked. However, in the majority of cases none of the temperature measuring points 3, 3', 4, 4', 5, 5', 6, 6', 7, 7' will be located exactly in this plane, but in between. Just how much the actual core temperature in the center plane A of the food 11 to be cooked will vary from the lowest measured temperature toward the end of the cooking process will depend on how thick the food 11 to be cooked is, how close the temperature measuring points 3, 3', 4, 4', 5, 5', 6, 6', 7, 7' are located to the center plane, and how large the insertion angle of the core temperature probe 1, 1' is. The thicker the food 11 to be cooked is, or the larger the distances of the temperature measuring points 4, 5, 5', 6' having the lowest temperature are from the surface of the food 11 to be cooked toward the end of the cooking process, the flatter the parabola will be, which can be approximated by e-functions in the region of the center of the food 11 to be cooked, and accordingly the lower the amount will be which must be subtracted from the lowest measured temperature in the interior of the food 11 to be cooked so as to arrive at a correct core temperature.

The same applies analogously to the insertion angle of the core temperature probe 1, 1', which can be taken into consideration by multiplying the contribution to the sine of the insertion angle. The temperature difference between the two temperature measuring points 3, 3', 4, 4', 5, 5', 6, 6', 7, 7' having the lowest temperature can be used to determine how close the temperature measuring point 4, 5, 5', 6' having the lowest temperature in the food 11 to be cooked is located to the center plane A, wherein only those temperature measuring points 3, 3', 4, 4', 5, 5', 6, 6', 7, 7' are considered, which are located inside the food 11 to be cooked and the temperatures of which have risen after the measurement was started, preferably until at least almost the end of the measurement. The last criterion is intended to prevent temperature measuring points 3, 3', 4, 4', 5, 5', 6, 6', 7, 7' from being considered, which are located too closely to the upper surface of the food 11 to be cooked.

The exact mathematical formulations will preferably be empirically determined, and thus in a manner that suits the respective food to be cooked, cooking appliance or the respective core temperature probe 1, 1'. The highlighted measures allow the insertion angle, the thickness of the food to be cooked and an improvement in the determination of the core temperature to be achieved. All these variables may be used to control the cooking process and thus result in an improvement of the cooking result.

The cooking process may also be controlled by calculating a correction factor from the insertion angle and the temperature or temperatures of the temperature measuring points 3, 3', 4, 4', 5, 5', 6, 6', 7, 7' measured in the food 11 to be cooked, instead of calculating a corrected core temperature and using the same to control the cooking process, wherein the correction factor is used to extend the cooking duration or change the power of the stovetop. This represents a different form of correction of the measured core temperature. In such a method, the lowest measured temperature of the temperature measuring points 3, 3', 4, 4', 5, 5', 6' in the food to be cooked can be defined as the core temperature. For example, the automatic cooking process is then not terminated when a particular core temperature has been reached, but a certain time span thereafter. The extent of this time span is again determined by the insertion angle of the core temperature probe and by the distance and the temperature difference between the two temperature measuring points 4, 5, 5', 6' having the lowest temperature. The larger the insertion angle is relative to the surface of the pan, and thus relative to the upper surface of the food 11 to be cooked, and the larger the distance is between the two measuring points, and the smaller the temperature difference is between the two temperature measuring points 4, 5, 5', 6' having the lowest temperature, the longer this time span is selected to be.

A similar method may be employed for varying the heat input into the food 11 to be cooked by adapting the power of heating elements, such as the stovetop.

Figure 2:
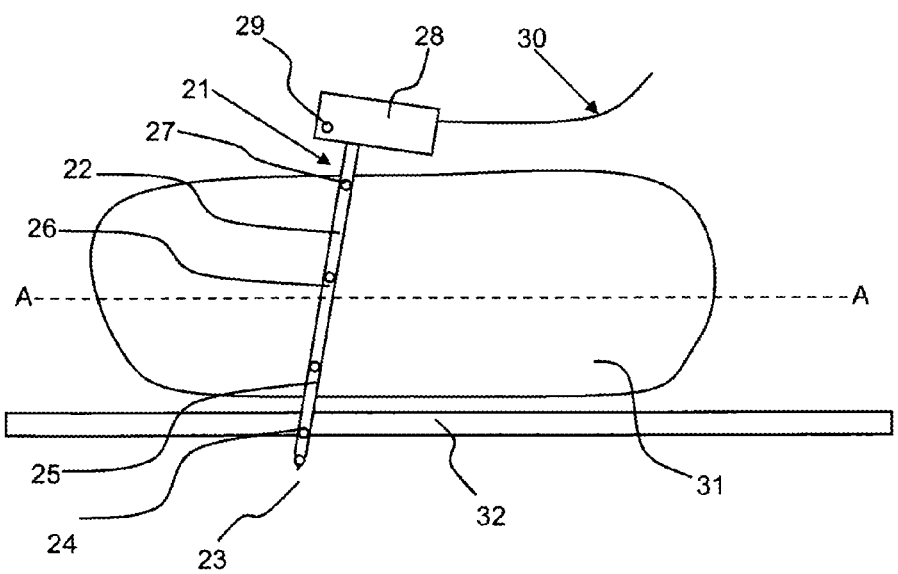
FIG. 2: shows a schematic cross-sectional view of food to be cooked comprising a core temperature probe on a grate.

It was shown in FIG. 1 based on one exemplary embodiment how the method according to the invention can be used in a pan or another heating appliance (not shown) that is heated from one side. FIG. 2 then shows how the method according to the invention can also be applied to cooking chambers of cooking appliances (not shown), such as ovens, in which the heat penetrates into the food 31 to be cooked from all sides.

For this purpose, FIG. 2 shows a schematic cross-sectional view of a core temperature probe 21, comprising a lance 22 in which several thermocouples 23, 24, 25, 26, 27 for determining the temperature in the interior of the food 31 to be cooked are arranged. The core temperature probe 21 further includes a handle 28, in which a thermocouple 29 for determining the ambient temperature (here the cooking chamber temperature) is arranged. As with the thermocouple 9, 9', which is arranged in the handle 8, 8' of the core temperature probe 1, 1', the thermocouple 29 in the handle 28 is not necessary for carrying out methods according to the invention, but it does offer several advantages in the implementation.

The thermocouples 23, 24, 25, 26, 27 are connected to a control unit (not shown) by way of cable 30, wherein the control unit is used to implement the method according to the invention. For this purpose, the control unit includes a processing unit and a memory unit. Such a control unit for a method according to the invention may be implemented by way of a commercially available computer, for example.

Here, the food 31 to be cooked is located on a grate 32. It is thus possible for the food 31 to be cooked to be entirely penetrated by the core temperature probe 21. It is therefore no longer assured here that one of the temperature measuring points 23, 24, 25, 26, 27 is located on the surface of the food 31 to be cooked. In addition, the thermal energy penetrates into the food 31 to be cooked from all sides. However, this also simplifies matters considerably because the coldest point is always located in the central region of the center plane A (in FIG. 2, a dotted line marked as A-A).

After a settling time, as described above, the temperature measuring points 23, 24 located on the outside, and not located in the food 31 to be cooked, can be determined in that these have taken on the cooking chamber temperature, which is measured, for example, with the aid of the thermocouple 29 in the handle 28 of the core temperature probe 21.

The insertion angle of the core temperature probe 21 can be determined analogously to the example of FIG. 1, wherein here the distances x of the temperature measuring points can be determined from both sides of the food 31 to be cooked. Again, the thickness of the food 31 to be cooked can be determined from the insertion angle.

The core temperature of the food 31 to be cooked can also be determined analogously to the exemplary embodiments of FIG. 1.

The characteristics of the invention disclosed in the above description, as well as in the claims, figures and exemplary embodiments may be essential for the implementation of the invention in its various embodiments either alone or in any arbitrary combination with each other.

LIST OF REFERENCE NUMERALS 1, 1', 21 core temperature probe
2, 2', 22 lance
3, 3', 23 thermocouple in the lance tip/1st temperature measuring point
4, 4', 24 thermocouple/2nd temperature measuring point
5, 5', 25 thermocouple/3rd temperature measuring point
6, 6', 26 thermocouple/4th temperature measuring point
7, 7', 27 thermocouple/5th temperature measuring point
8, 8', 28 handle
9, 9', 29 thermocouple in the handle
11, 31 food to be cooked
12 pan bottom
30 cable
32 grate
A-A center plane in the food to be cooked
$x_3$ distance of the 3rd temperature measuring point from the surface of the food to be cooked
$x_4$ distance of the 4th temperature measuring point from the surface of the food to be cooked

The invention claimed is:

1. A method for determining an insertion angle of a core temperature probe having a plurality of temperature measuring points in a food to be cooked for controlling a cooking process, wherein the insertion angle refers to an angle between a surface of the food to be cooked at a point of the surface at which a lance of the core temperature probe is placed, and the lance, the method comprising:
   starting at a second time $t_2$ after inserting the core temperature probe into the food to be cooked, and determining the insertion angle of the core temperature probe into the food to be cooked based on a measured increase in temperature of at least two of the plurality of temperature measuring points over time.

2. The method according to claim 1, comprising:
   determining, at a first time $t_1$ after inserting the core temperature probe into the food to be cooked, based on the temperatures of the temperature measuring points which of the temperature measuring points is located within the food to be cooked and outside the food to be cooked, and starting at the second time $t_2$, which is temporally after the first time $t_1$, and determining the insertion angle of the core temperature probe into the food to be cooked based on the measured increase in temperature of at least two temperature measuring points that were determined as being located within and not outside the food to be cooked.

3. The method according to claim 2, comprising:
   defining a temperature measuring point as being located outside the food to be cooked when this measuring point exceeds a threshold temperature at the time $t_1$ and defining a temperature measuring point as being located within the food to be cooked when this measuring point, together with a further temperature measuring point, has a temperature below the ambient temperature or below a temperature that is 0.1° C. to 10° C. above the ambient temperature.

4. The method according to claim 1, comprising:
   determining a correction factor from the insertion angle, making a determination of a core temperature of the food to be cooked in which the correction factor is multiplied with a correction contribution, and subtracting the correction contribution multiplied with the correction factor from a lowest temperature or a second-lowest measured temperature, and using the core temperature thus determined to control the cooking process.

5. The method according to claim 4, wherein the correction factor increases as the insertion angle approaches 90°, the method comprising:
   using the sine of the insertion angle of the core temperature probe is used as the correction factor.

6. The method according to claim 5, wherein the correction contribution is dependent on a spatial distance of two temperature measuring points having the lowest temperature and the temperature difference between at least two temperature measuring points having the lowest temperature.

7. The method according to claim 6, wherein the correction contribution is dependent on the change of the temperature of at least one temperature measuring point over time or of at least two temperature measuring points.

8. A method according to claim 1, comprising:
   taking into consideration the insertion angle in determining a core temperature of the food to be cooked, in determining a cooking end time of the cooking process, or in controlling an energy input into the food to be cooked for controlling the cooking process after the second time $t_2$.

9. A method according to claim 1, comprising:
   determining the insertion angle for controlling the cooking process on a basis that the food to be cooked has a homogeneous temperature at the beginning of the cooking process, that the heat is uniformly introduced into the food to be cooked from all sides, and that the food to be cooked has a shape of a cylinder.

10. A method according to claim 1, comprising:
    calculating the insertion angle for controlling the cooking process on a basis that the food to be cooked has an elevated temperature in a region of an upper side of the food to be cooked at the beginning of the cooking process, that the heat is introduced into the food to be cooked from an underside of the food to be cooked, and that the food to be cooked has a shape of a flat cylinder.

11. The method according to claim 10, comprising:
    calculating the insertion angle for controlling the cooking on a basis that that a temperature measuring point is located at a tip of the core temperature probe and that the tip is located on the underside of the food to be cooked.

12. A method according to claim 1, comprising:
    determining at least one of a distance of at least one temperature measuring point from the surface of the food to be cooked and the thickness of the food to be cooked from the insertion angle and used to control the cooking process.

13. A method according to claim 1, comprising:
    determining at least one of a temperature profile in the food to be cooked and a temporal progression of a temperature profile in the food to be cooked is from the insertion angle and a temporal progression of the temperature of the temperature measuring points.

14. A method according to claim 1, the comprising:
    Determining a temporal progression of a forecast temperature profile or a forecast temporal or local progression of the core temperature in the food to be cooked from the insertion angle and a temporal progression of the temperature of the temperature measuring points, and using the forecast temporal progression of the temperature profile or the forecast temporal or local progression of the core temperature in the food to be cooked to control the cooking process.

15. A control unit for a cooking appliance for carrying out a method according to claim 1, wherein the control unit comprises a microprocessor and a memory for calculating the insertion angle, for carrying out a cooking process, and for controlling a cooking appliance.

16. A cooking appliance comprising a control unit according to claim 15 and at least one core temperature probe having a plurality of temperature measuring points, wherein the cooking appliance comprises at least one of a stovetop, an induction cook top, an oven, a combi steamer, a steamer, or a microwave oven.

* * * * *